United States Patent
Milas (10) Patent No.: US 8,539,568 B1
(45) Date of Patent: Sep. 17, 2013

(54) IDENTITY MAP CREATION

(75) Inventor: Brian T. Milas, Belmont, MA (US)

(73) Assignee: Courion Corporation, Westborough, MA (US)

( * ) Notice: Subject to any disclaimer, the term of this patent is extended or adjusted under 35 U.S.C. 154(b) by 723 days.

(21) Appl. No.: 12/245,513

(22) Filed: Oct. 3, 2008

Related U.S. Application Data (60) Provisional application No. 60/977,241, filed on Oct. 3, 2007.

(51) Int. Cl.
*G06F 17/30* (2006.01)

(52) U.S. Cl.
USPC .......................................................... 726/8

(58) Field of Classification Search
None
See application file for complete search history.

(56) References Cited

U.S. PATENT DOCUMENTS

| | | | |
|---|---|---|---|
| 5,748,890 A | 5/1998 | Goldberg et al. | 395/188.01 |
| 6,044,464 A | 3/2000 | Shamir | 713/186 |
| 6,055,637 A | 4/2000 | Hudson et al. | 713/201 |
| 6,065,120 A | 5/2000 | Laursen et al. | 713/201 |
| 6,092,199 A | 7/2000 | Dutcher et al. | 713/201 |
| 6,144,959 A | 11/2000 | Anderson et al. | 707/9 |
| 6,158,010 A | 12/2000 | Moriconi et al. | |
| 6,233,608 B1 | 5/2001 | Laursen et al. | 709/217 |
| 6,269,405 B1 | 7/2001 | Dutcher et al. | 709/248 |
| 6,339,830 B1 | 1/2002 | See et al. | 713/202 |
| 6,345,361 B1 | 2/2002 | Jerger et al. | 713/200 |
| 6,427,209 B1 | 7/2002 | Brezak, Jr. et al. | 713/201 |
| 6,615,350 B1 | 9/2003 | Schell et al. | 713/168 |
| 6,662,187 B2 | 12/2003 | Barnett et al. | 707/101 |
| 6,757,720 B1 | 6/2004 | Weschler, Jr. | 709/220 |
| 6,971,014 B1 | 11/2005 | Hagmeier et al. | 713/182 |
| 7,085,834 B2 | 8/2006 | Delany et al. | 709/225 |
| 7,107,441 B2 | 9/2006 | Zimmer et al. | 713/1 |
| 7,131,000 B2 | 10/2006 | Bradee | 713/164 |
| 7,136,903 B1 | 11/2006 | Phillips et al. | 709/217 |
| 7,325,128 B2 | 1/2008 | Wood et al. | |
| 7,412,720 B1 | 8/2008 | Frey et al. | 726/8 |
| 7,415,607 B2 | 8/2008 | Sinn | 713/158 |
| 7,434,257 B2 | 10/2008 | Garg et al. | |
| 7,451,301 B2 | 11/2008 | Zimmer et al. | 713/1 |
| 7,496,954 B1 | 2/2009 | Himawan et al. | |
| 2002/0073305 A1 | 6/2002 | Joseph et al. | 713/1 |

(Continued)

FOREIGN PATENT DOCUMENTS

| | | |
|---|---|---|
| EP | 1 241 858 A2 | 9/2002 |
| WO | WO 02/061653 A2 | 8/2002 |

OTHER PUBLICATIONS

Configuring the Portal Logoff URL (SAP Library—Portal), printed Dec. 14, 2012, published Aug. 23, 2006.*

(Continued)

*Primary Examiner* — Brandon Hoffman
(74) *Attorney, Agent, or Firm* — Mintz Levin Cohn Ferris Glovsky and Popeo, P.C.

(57) ABSTRACT

A method for creating an identity map, the method including determining, using a single sign on component, if a user is a presented with a logon screen related to a resource, capturing logon information, using the SSO component, wherein at least a portion of the logon information is received from the user, determining, using the SSO component, if the user successfully accessed the resource using the information received from the user, and determining if an identity map includes an entry corresponding to at least one of the user and the resource.

23 Claims, 2 Drawing Sheets

(56) References Cited

U.S. PATENT DOCUMENTS

| | | | |
|---|---|---|---|
| 2002/0091745 A1 | 7/2002 | Ramamurthy et al. | 709/100 |
| 2002/0107920 A1 | 8/2002 | Hotti | 709/204 |
| 2002/0120868 A1 | 8/2002 | Hay | 713/201 |
| 2002/0144119 A1 | 10/2002 | Benantar | |
| 2002/0147801 A1 | 10/2002 | Gullotta et al. | 709/223 |
| 2002/0156904 A1 | 10/2002 | Gullotta et al. | 709/229 |
| 2003/0023880 A1 | 1/2003 | Edwards et al. | 713/201 |
| 2003/0105654 A1 | 6/2003 | MacLeod et al. | 705/7 |
| 2003/0126137 A1 | 7/2003 | McFadden | |
| 2006/0136986 A1 | 6/2006 | Doolittle | 726/1 |
| 2006/0161783 A1 | 7/2006 | Aiken et al. | 713/182 |
| 2007/0156694 A1 | 7/2007 | Lim | 707/9 |
| 2007/0234410 A1 | 10/2007 | Geller | |
| 2007/0277231 A1 | 11/2007 | Medvinsky et al. | 726/5 |
| 2008/0059804 A1 * | 3/2008 | Shah et al. | 713/186 |
| 2008/0276308 A1 | 11/2008 | Graser et al. | |
| 2009/0077638 A1 * | 3/2009 | Norman et al. | 726/5 |

OTHER PUBLICATIONS

Google printoff showing silent sso with article dating Aug. 23, 2006.*
International Search Report and the Written Opinion for PCT/US08/86244, mailed Feb. 2, 2009.

* cited by examiner

IDENTITY MAP CREATION

CROSS-REFERENCE TO RELATED ACTIONS

This application claims the benefit of, and priority to U.S. Provisional Application No. 60/977,241 filed Oct. 3, 2007, which is incorporated by reference herein in its entirety.

BACKGROUND

Today, computer users typically have many different accounts that are used to authenticate and log on to various services and programs. Examples of typical services and programs that a user may have an account with include one or more of the following: an operating system, an e-mail program, a document management system, a frequent flyer account, a corporate intranet site, etc. Typically, credentials such as a username and a password are used to verify a user's identity prior to the user being given access to a service or program.

One method to track a user's accounts (and possibly logon information) is the use of an identity map. An identity map typically associates a user with some or all of the accounts and/or identities assigned to, linked to, and/or associated with the user. For example, an identity map can contain information that shows that a user has an account with an operating system (e.g., a WINDOWS logon), a corporate billing system, and a corporate filing system.

An identity map can serve as the foundation for many identity related services and capabilities that an organization makes available to their workers, partners, or customers (e.g., users). For example, in order to review the access rights assigned to a user, the access rights of all of their accounts should be reviewed. An identity map can serve as an inventory for the user's accounts to be reviewed. Similarly, in order to fully remove access for a user, at termination for example, a system uses the inventory of all of the user's accounts so they can be disabled or deleted. Other capabilities such as password management, job change, relocation, review of user activity, etc. can rely on an identity map to provide the inventory of accounts for a user.

SUMMARY

In general, in an aspect, the invention can provide a computer readable storage medium including computer readable instructions that, when executed by a computer, cause the computer to determine, using a single sign on (SSO) component, if a user is a presented with a logon screen related to a resource, capture logon information, using the SSO component, wherein at least a portion of the logon information is received from the user, determine, using the SSO component, if the user successfully accessed the resource using the information received from the user, and determine if an identity map includes an entry corresponding to at least one of the user and the resource.

Implementations of the invention may provide one or more of the following features. The instructions are further configured to cause the computer to at least one of create and update an entry in the identity map in response to a determination that the user successfully accessed the resource. The instructions are further configured to cause the computer to create an entry in the identity map in response to a determination that the identity map does not include an entry corresponding to either of the user and the resource, the created entry corresponding to at least one of the user and the resource. The instructions are further configured to cause the computer to update an entry in the identity map in response to a determination that the identity map includes an entry corresponding to at least one of the user and the resource, the updated entry corresponding to at least one of the user and the resource. The instructions are further configured to cause the computer to receive a unique identifier relating to the user from an operating system. The logon information includes at least one of a username, a resource name, a resource type, and a password. The instructions are further configured to cause the computer to store in the identity map at least a portion of the captured logon information. The SSO component is an enterprise single sign on component. The instructions are further configured to cause the computer to execute the SSO component in silent mode. The instructions are further configured to cause the SSO component to post information, for use by other components, relating to at least a portion of the captured logon information, using at least one of an application programming interface and a web-based interface.

In general, in an aspect the invention can provide a method for creating an identity map, the method including determining, using an SSO component, if a user is a presented with a logon screen related to a resource, capturing logon information, using the SSO component, wherein at least a portion of the logon information is received from the user, determining, using the SSO component, if the user successfully accessed the resource using the information received from the user, and determining if an identity map includes an entry corresponding to at least one of the user and the resource.

Implementations of the invention may include one or more of the following features. The method further includes at least one of creating and updating an entry in the identity map in response to a determination that the user successfully accessed the resource. The method further includes causing the creation of an entry in the identity map in response to a determination that the identity map does not include an entry corresponding to either of the user and the resource, the created entry corresponding to at least one of the user and the resource. The method further includes updating an entry in the identity map in response to a determination that the identity map includes an entry corresponding to at least one of the user and the resource, the updated entry corresponding to at least one of the user and the resource. The method further includes receiving a unique identifier relating to the user from an operating system. The logon information includes at least one of a username, a resource name, a resource type, and a password. The method further includes storing in the identity map at least a portion of the captured logon information. The SSO component is an enterprise single sign on component. The method further includes executing the SSO component in silent mode. The method further includes posting information, for use by other components, relating to at least a portion of the captured logon information, using at least one of an application programming interface and a web-based interface.

In general, in an aspect, the invention can provide a computer readable storage medium including computer readable instructions that, when executed by a computer, cause the computer to receive an indication from an SSO component that a user was presented with a logon screen related to a resource, and that the user successfully logged onto the resource, receive logon information from the SSO component, wherein at least a portion of the logon information is received from the user, and use the information received from the SSO component to develop an identity map.

Implementations of the invention may include one or more of the following features. The computer readable instructions are further configured to cause the computer to create an entry in an identity map in response to at least one of receiving the indication from the SSO component and receiving the logon information from the SSO component. The computer readable instructions are further configured to cause the computer to determine, using the logon information received from the SSO component, if the identity map includes an entry corresponding to at least one of the user and the resource. The computer readable instructions are further configured to cause the computer to automatically retrieve at least one of the indication from the SSO component and the logon information from the SSO component. The computer readable instructions are further configured to cause the computer to automatically retrieve at least one of the indication from the SSO component and the logon information from the SSO component via at least one of an application program interface and a web-based service.

In general, in an aspect, the invention can provide a method including using an SSO component to build an identity map.

Implementations of the invention may include one or more of the following features. The SSO component is an enterprise single sign on component.

Various aspects of the invention may provide one or more of the following capabilities over prior techniques. Reduce the need of administrators to define and maintain rules that build the identity map by associating user(s) with their account(s). Interaction with end user users can be reduced. Accounts being used by users can be accurately reflected in the identity map. The burden placed on administrators and end users due to identity mapping can be reduced. Accuracy of the identity mapping process can be increased. A first identity map can be built more quickly. Changes in the business environment can be adapted to more quickly. The time required to create a complete identity map can be reduced. Fewer trusted/skilled administrators can be utilized. The burden on a user of creating an identity map can be reduced or even eliminated. Work done configuring, deploying and/or using enterprise single sign on systems can be leveraged to build an identity map.

Furthermore, identity mapping can be achieved for accounts that cannot be accurately and/or easily represented with a mapping rule. By using ESSO with identity mapping, the mapping can accurately reflect accounts assigned and/or used by a user that otherwise would have been missed or difficult to map with a rule. For example, suppose that a company has many accounts that are in use that were created before standard account naming conventions were used. Because these type of names are typically ad-hoc, it can be difficult or even impossible to do all of the mapping using rules. Typically, mapping would be done by manually reconciling and assigning the accounts to a user in the identity map. Using the ESSO approach, rules do not have to be written, nor is manual mapping required, and the mapping can be more accurate.

These and other capabilities of the invention, along with the invention itself, will be more fully understood after a review of the following figures, detailed description, and claims.

DETAILED DESCRIPTION

Embodiments of the invention provide techniques for populating an identity map using enterprise single sign on (ESSO). For example, an ESSO component is installed on a computer system used by a user. The ESSO component is configured to recognize when the user is attempting to log on to a resource. The ESSO component is configured to recognize a successful logon to the resource being accessed by the user. The ESSO component is configured to capture the logon information (e.g., a user name) that the user used to successfully log on. The ESSO component is configured to store information related to the user and the user's associated accounts in an identity map. The ESSO component is also configured to recognize exceptions to the logon process such as password reset reminders. The ESSO component can also be configured to operate in a "silent" mode where the user may not be aware that the ESSO component is operational (e.g., ESSO watches and logs the user's logons to create an identity map without the user being interrupted and/or knowing). Other embodiments are within the scope of the invention.

Today, users have many accounts which can be used to, for example, access a service, or secure area. For example, a hypothetical user, Chris Smith (e.g., a subject named "Chris Smith") can have many accounts that are used on a daily basis, and some that are used only a few times per year. Examples of such accounts include, for example, a MICROSOFT Active Directory account (e.g., where the account name is csmit), an IBM Resource Access Control Facility (RACF) account (e.g., where the account name is c281), a SUN Solaris account (e.g., where the ccount name is chriss), a MICROSOFT Exchange account (e.g., where the account is chris.smith@mycompany.com), a mobile phone account (e.g., having an account number of 617-555-1212), and a RSA SecurID token that as a serial number of, for example, ABC289x482. Furthermore, Chris may have an interest in using, but does not have an account with, other resources such as an SAP account or a salesforce.com account. Note that the naming convention may be inconsistent across the systems where Chris has an account. Having an association between Chris Smith the person (e.g., the user) to his accounts and resources is preferably an element of an identity management solution that uses an identity map.

An identity map can be a repository that stores the relationship between users and the resources that represent their identity. Resources can include, for example, elements that relate to accounts and/or identities that are given to a user, such as operating system accounts, application accounts, e-mail accounts, online (e.g., web) accounts, tokens, smart cards, e-mail accounts, time keeper accounts, accounts accessed via web page (e.g., frequent flier accounts, credit card accounts, banking accounts, merchant accounts), accounts accessed via terminal emulator, and/or anything that is assigned to the user. An identity map can also store the relationship between a user and the resources that the user has been given. Typically, an identity map consists of information such as a unique identifier associated with the user, a unique identifier for a target system (e.g., a hostname, a network name, an IP address), a type of a resource (e.g., an object) on the target system (e.g., user account, resource, token), and a unique identifier for the resource instance, of the given type on the target system (e.g., bsmith, jsmith, nshitm, SN:ABC289x482).

The process by which an identity map is created and maintained is called identity mapping. Preferably, the process of creating an identity map includes discovery and the use of rules that are applied to resources and/or users. Discovery is preferably used to identify the set of possible resources that are candidates for being associated with users. For example, discovery can include discovering details about resources on many systems, and/or discovering details about users. Rules can be used in the identity mapping process to define the logic that associates users with resources, to resolve conflicts, and/or to resolve ambiguity. For example, rules can be developed that i) address varied resource naming conventions (e.g., the difference in naming conventions between a MICROSOFT and NOVELL e-mail server), ii) address how to resolve conflicts between resource names, and iii) establish a priority between rules, although other types of rules can also be implemented.

The mapping process preferably further includes applying the rules to the resources and users that have been discovered. For example, discovered data can be staged, users can be associated with resources according to the rules, certain types of resources can be excluded (e.g., system accounts and administrator accounts), conflicts can be identified (e.g., two John Smiths), users and resources can be manually reconciled and associated, mapping information can be provided for use by external applications, and/or certain tasks can be performed on a scheduled basis.

The process of identity mapping can also involve discovery of potential resources on systems, understanding the various naming conventions used by different systems, and associating the correct accounts with each user. For example, discovery can include discovering some or all of the potential resources on a system such as an identity object (e.g., an account) associated with a user and other objects that are assigned to and/or owed by a user (e.g., a token and/or smart card). The process can accommodate accounts that are manually associated with a user. The process can also identify naming conflicts, and can highlight ambiguity when it cannot associate a resource with a user. Furthermore, the identity mapping process can incorporate mapping based on the usage patterns of a user (e.g., which can help improve the accuracy of an identity map).

An identity map can be used by software applications to inventory and locate some or all of the resources that are assigned to a user. For example, applications such as governance, risk management, and compliance (GRC) applications, role and/or provisioning applications, password management applications, and/or user activity applications can use the information contained in an identity map. Thus, an identity map can be an element of the applications that provides information to these applications such as what accounts and resources are assigned to a given user. Identity maps can also be useful when a software system desires to modify one or more resources for a user and when a system administrators wants to identify users of a system.

Identity mapping can be desired for many common identity management activities, such as:

Given a single account, finding all accounts associated with a user by using the account to find the associated user, then using the identity map to lookup all accounts for the associated user (e.g., a "reverse lookup").

In order to reset a password on an account for a user, a software system can associate the user with their account(s).

To synchronize multiple passwords for a user, the software system can map the user to their accounts and can perform the synchronization by setting the password associated with each account.

To effectively disable access upon termination of a user, a software system can turn off and/or remove access for all accounts assigned to the user.

To effectively view and/or review access rights for a user, a software system can associate a user with their accounts and subsequently examine the authorizations (e.g., access rights) for each account.

To recover the hard assets assigned to a worker at termination, the software system preferably is able to associate the worker with the resources that they have been assigned (e.g., mobile device, corporate credit card, company car).

To review the activities of a user across all systems such as a user's logon activity, file access, and/or application access.

The model can apply to other activities such as changes to access, addition or removal of accounts, and others.

The ESSO software can be configured to automate the logon process by interacting with the user and the applications that are used. The ESSO software is configured to detect the presence of a logon screen such as when a user logs on to a desktop (e.g., an operating system), launches an application, and/or is prompted with a logon screen during the operation of an application. In response to detecting a logon screen, the ESSO software is configured to determine whether credentials already exist for the particular logon screen shown to the user. If credentials corresponding to the particular logon screen shown to the user already exist in an ESSO repository, the ESSO software can retrieve the stored credentials and automate the logon process for the user (e.g. eliminating the need for a user to input logon credentials). If no credentials already exist in the ESSO repository, the ESSO system can be configured to prompt the user to enroll the user's credentials for use with the ESSO system. If the user successfully logs on, the ESSO software can collect and save the provided credentials in an ESSO repository for later use. The ESSO software can also be configured to handle other logon related events such as handling requests to update credentials (e.g. password change needed, password expiration), and/or password expiration reminders.

Preferably, certain aspects of the ESSO software are disabled for use with an identity management system. For example, the ability of the ESSO software to interact with the user for purposes of automating logon, enrollment, and/or handling password change requests can be disabled. By disabling all user interaction while still maintaining the passive ability of ESSO software to detect and monitor behavior, the ESSO software is able to determine when a logon has succeed and/or failed. The ESSO software can be further configured to send logon information to the identity management system (e.g. as described herein), in response to a successful logon, for entry into an identity map.

Figure 1:
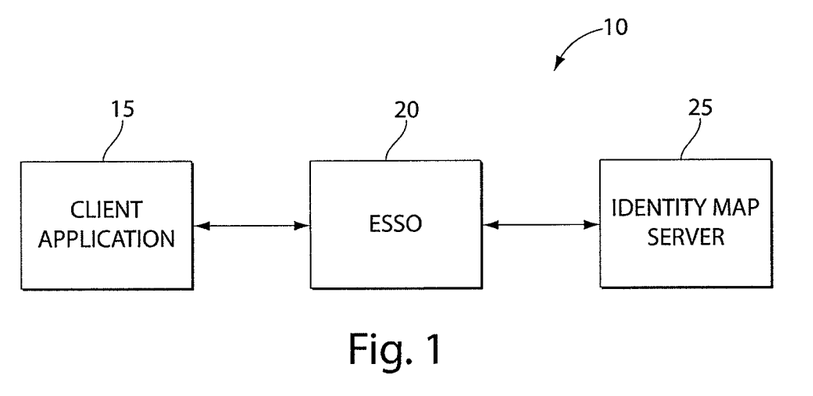
FIG. 1 is a block diagram of an identity map system.

Referring to FIG. 1, an identity map system 10 is configured to create an identity map, and includes client applications 15, ESSO software 20, and an identity map server 25. The client applications 15, the ESSO software 20, and/or the identity map server 25 can be configured to communicate with each other. While each of the client application 15, the ESSO software 20, and the identity map server 25 are shown as single modules, other configurations are possible. For example, the ESSO software 20 can be split into a client and server configuration. Furthermore, the identity map system 10 can be implemented on one or more computers. For example, the client applications 15, the ESSO software 20, and/or the identity map server 25 can be part of a single application that is executed on a single computer and/or can be one or more modules and/or applications that are executed on multiple computers. Furthermore, the identity map system 10 can be implemented over several computers which are connected via a network. Thus, one configuration that is typical in a corporate environment is a configuration where each user's computer includes one or more of the client applications 15 and an ESSO client, and a central server includes the ESSO server and the identity map server 25. Other configurations are possible.

The client applications 15 are configured to provide computer functionality to the user. For example, the client applications 15 can include applications like web browsers, e-mail programs, FTP clients, proprietary applications, and/or any other application used by a user. Preferably, the client application 15 are executed locally on the same computer used by the user, although other configurations are possible. For example, the user may access a remote client application 15 that is executed on a remote computer using a terminal emulator. Typically, one or more of the client applications 15 are configured to prompt the user for credentials (e.g., a username and/or password) at some point during the user's use of the application. For example, the client application 15 can prompt the user for credentials when the application is opened, and/or at various points during operation of the application. The client applications 15 are also configured to receive and/or verify credentials from the user. For example, an e-mail client is configured to prompt a user for credentials when the user attempts to retrieve e-mail.

The ESSO software 20 is configured to interact with the client applications 15 and the identity map server 25 to build an identity map. Preferably, the ESSO software 20 is deployed for use with systems that users typically use. For example, ESSO software can be installed on these user's personal/desktop computer and/or workstation. As discussed above, the ESSO software 20 can be a single application running on a single computer, and/or the ESSO software 20 can be split among several computers (e.g., an ESSO client executed on a computer used by a user and an ESSO server executed on a central server). The ESSO software 20 is configured to receive from, for example, the operating system of the user's personal computer, a unique ID that corresponds to the user. Preferably, the unique ID is received after the user has successfully logged on to the computer system operating the client applications 15 (e.g., by logging onto MICROSOFT WINDOWS and/or MAC OS).

The ESSO software 20 is configured to monitor the user's activities, and recognize logon screens that prompt the user to provide credentials. Logon screens can be presented when the user opens an application, and/or at other times (e.g., when a user attempts to check e-mail or when the user navigates to an access-controlled webpage). Logon screens can be automatically detected by the ESSO software 20, and/or the ESSO software 20 can be notified of the logon screen by another application. The ESSO software 20 is configured such that when a logon screen is detected, the user provides credentials, and the application accepts the credentials and allows logon, the ESSO software can capture and stores the credentials provided by the user. The logon screens can take the form of, for example, a stand-alone window, a window within a terminal emulated screen, and/or can be embedded in webpage.

The ESSO software 20 is configured to recognize and/or receive additional information related to the logon event that is detected. For example, the event triggered in the ESSO software 20 by the recognition of a logon screen can be associated with the specific client application 15 that the user is using and/or a unique identifier of the specific client application 15. The ESSO software 20 can be further configured such that the event triggered in the ESSO software 20 is associated with a resource type (e.g., an account) for the target. The ESSO software 20 is configured to monitor the logon attempt and to, for example, record the unique resource identifier (e.g., an account name) in response to a successful logon event.

The ESSO software 20 is also configured to receive and process events that occur during the process of a user logging on. For example, the ESSO software 20 is configured to recognize events such as failed logons, warnings, and/or successful logons. The ESSO software 20 can be configured to handle each of the events in a different manner. For example, the ESSO software 20 can detect and/or capture warning events such as a warning that a user's password is set to expire, a warning that a membership will soon expire, a failed logon, an account being locked out, an account being expired, an account being disabled, a password being expired, and/or that an account cannot logon during certain hours. Similarly, if a password change is required, other warnings can also be detected such as a password being too short, a password being too long, a password not meeting strength requirements, and a password already being in use. The ESSO software 20 is configured such that in the event that a warning is detected, the ESSO software 20 can provide notification to the user (and/or a third party), and or can make an entry into a log. The ESSO software 20 can also be configured to determine when no further errors have occurred (e.g. once a user has provided a new password of the correct length) and save the appropriate credentials.

The ESSO software 20 is configured such that it can perform checks to determine whether or not the identity map should be updated. For example, the ESSO software 20 is configured to query the identity map server 25 to determine if the unique resource ID, unique target ID, and/or the resource type are already in use in the identity map, although other queries can be made as well. The ESSO software 20 is also configured to cause the unique resource ID, unique target ID, and/or the resource type to be recorded in the identity map if each of the unique resource ID, unique target ID, and/or the resource type are not already in use by the user, although other criterion can be used. Furthermore, the ESSO software 20 can be configured to cause other types of information to be recorded in the identity map (e.g., a date and/or time of a desktop logon, a date and/or time that an application was started, a date and/or time that a successful logon occurred, and an identifier corresponding to the particular desktop computer the user is using). For example, the ESSO software 20 can automatically provide the desired information to the identity map server 25 for updating.

While the ESSO software 20 has been described as performing checks such as determining whether or not the identity map should be updated, some or all of this functionality may be performed by other components such as the identity map server 25. For example, the ESSO software 20 can be configured such that upon detecting a successful logon, the ESSO software 20, rather than querying the identity map server 25, makes the detected information available to the identity server 25. The identity server 25 can be configured to make a determination about whether to create a new entry, update an existing entry (e.g., with date and/or time and/or desktop system details), ignore the new logon credentials because an entry already exists for the user, and/or notify the user and/or a third party because an entry already exists for a different user.

While the ESSO software 20 has been described as sending the information to the identity map server 25, the identity server 25 can be configured to retrieve the information from the ESSO software 20 at predetermined times (e.g., once a day), to retrieve the identity map information, and/or to perform the desired checks itself. For example, the identity map server 25 can be configured to retrieve the information from an API and/or web service that the ESSO software 20 provides The identity map server 25 is configured to receive and/or request information from the ESSO software 20 to update and/or build the identity map. For example, the identity map server 25 is configured to receive from the ESSO software 20, the unique identifier corresponding to the user, the unique resource ID, the unique target ID, and the resource type. Other types of information can also be received.

The identity map server 25 can also be configured recognize and send notifications if a conflict is detected. For example, the identity map server 25 can be configured to notify the user and/or a third party of a conflict such as if one or more of the unique resource ID, unique target ID, and/or the resource type are already in use. As a further example, the identity map server 25 can directly notify a party of the conflict (e.g., by sending an e-mail directly to the user), and/or can use an intermediary (e.g., sending a notification to one of the client applications 15 to notify the user). Furthermore, the identity map server 25 can also be configured to log a conflict in a log file.

The identity map created by the identity map server 25 is, for example, a database and/or directory that includes a single file for all users of a computer system that contains multiple entries, and/or a file that is unique to a specific user. Other configurations are possible. Preferably, the identity map server 25 is stored in a memory such as a hard drive and/or RAM, although other types of memories can be used.

The ESSO software 20 can be configured to provide the ability for an administrator to perform one or more administrative functions. Logon attempts by users can be recognized and automated (e.g., the requested credentials are automatically supplied). Successful logon attempts by users can be recognized (e.g., analogous to recognizing a password expiration event and/or a logon failure event). Other administrative functions can also be performed.

Furthermore, the ESSO software 20 and/or the identity map server 25 can be configured to run in "silent mode" where the user is less aware, or completely unaware that the ESSO software 20 and/or the identity map server 25 is in operation. Preferably, when the ESSO software 20 and/or the identity map server 25 is operating in silent mode, the ESSO software 20 and/or identity map server 25 do not interact with the user (e.g., acts passively and/or does not actively prompt the user for input). Rather, preferably, the ESSO software 20 is configured to watch and record successful logons without interrupting the user for, for example, passwords or enrollment information (e.g., the ESSO software 20 collects the passwords silently). In some configurations, the ESSO software 20 can be configured such that no icon is shown in system notification area of the Windows desktop. The ESSO software 20 can be configured such that when it is operating in silent mode it is still able to distinguish between successful logons and other logon situations such as canceled logons, failed logons, password expiration, etc.

The ESSO software 20 and/or the identity map system 25 can be deployed for an extended period, and/or can be deployed for a shorter predetermined time period. For example, the ESSO software 20 and/or the identity map system 25 can be deployed for a period of time that is sufficient to capture the logons that are used by users (e.g., if the user's associated accounts do not change often). At the end of this period, accounts actively being used for logon have been registered in the identity map by the ESSO software 20 and/or the identity map system 25. If desired, the remaining accounts are system, administrative, or unused accounts and can be managed and mapped by other identity mapping techniques (such as using rules, claiming, manual mapping, etc). For example, the ESSO software 20 can be configured to ignore certain logon screens such as those used to access accounts having special security concerns.

While the identity map system 10 has been described as using the ESSO software 20 to obtain credentials, including passwords, other configurations are possible. For example, in identity map can be built and/or updated without obtaining passwords from the user. Furthermore, identity map system 10 can be configured to record an identity map entry even if the user chooses not to enroll the credentials for ESSO software processing and/or chooses not to have ESSO automate the application logon process. For example, this scenario might occur if the client application 15 being used by the user is ESSO enabled, but the user decides not to enroll their credentials. The system is preferably configured to record an identity map entry upon successful logon.

Figure 2:
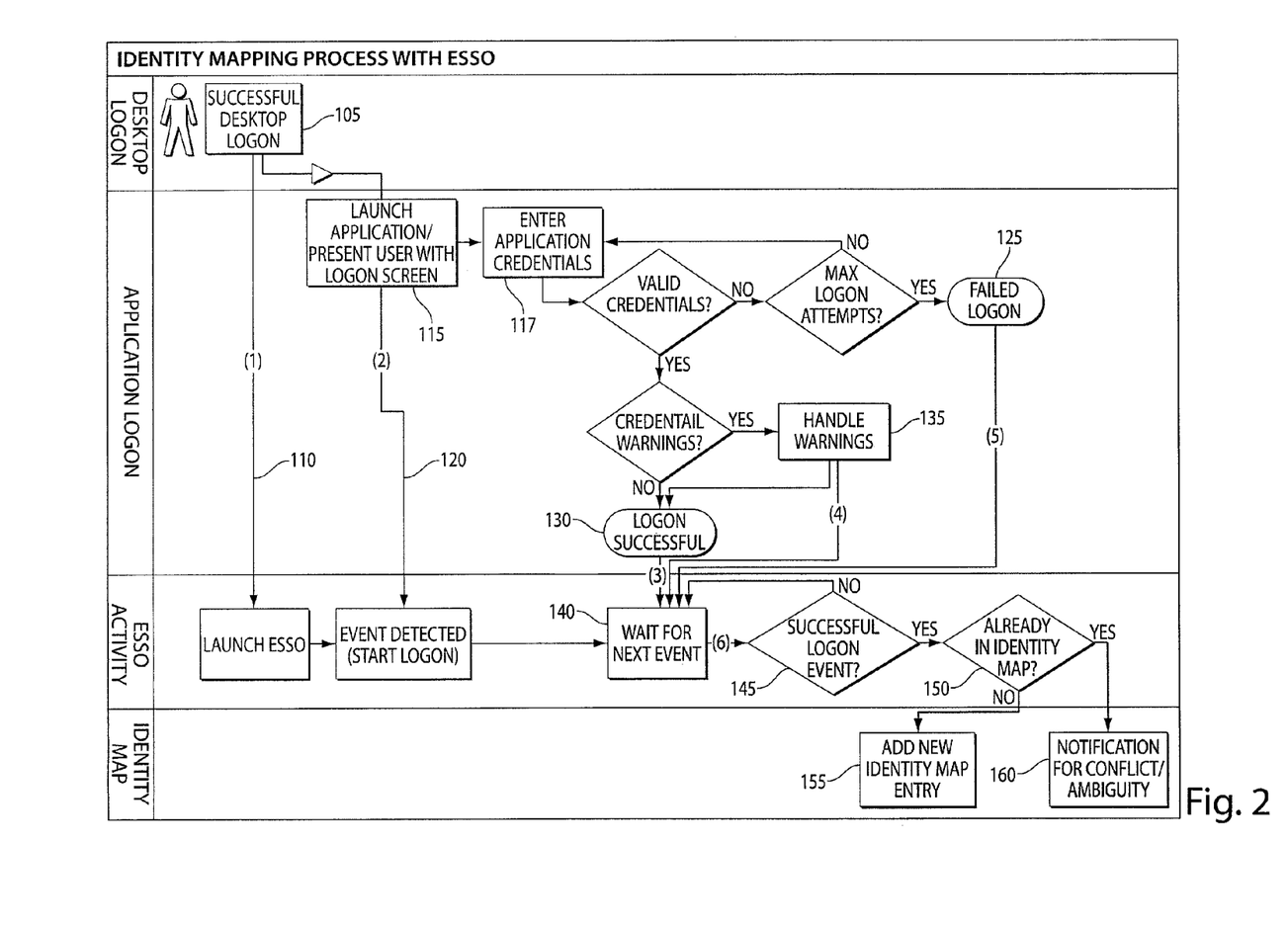
FIG. 2 is a functional block diagram of a process that can be implemented, at least in part, using the identity map system shown in FIG. 1.

In operation, referring to FIG. 2, with further reference to FIG. 1, a process for performing identity mapping using the identity mapping system 10 includes the stages shown. The process, however, is exemplary only and not limiting. The process may be altered, e.g., by having stages added, removed, altered, or rearranged.

At stage 105 the user performs a successful desktop logon. For example, the user logs onto a computer running a WINDOWS, MAC, or LINUX operating system. In response to the successful desktop logon, the ESSO software 20 is launched. In the event that the ESSO software 20 includes separate ESSO client and ESSO server applications, the ESSO server application may already be running and only the ESSO client software is launched in response to the successful desktop logon. After the ESSO software 20 successfully launches, a unique identifier of the user is received from the user's computer (e.g., line 110). The unique identifier can be detected automatically by the ESSO software 20 and/or can be automatically provided by the operating system.

At stage 115, the user is presented with a logon screen (e.g., a request for credentials). For example, the logon screen can be presented when the user starts one of the client applications 15, and or can be presented during the ongoing operation of one of the client applications 15 (e.g., by navigating to an access-controlled webpage and/or accessing a secure site via a terminal emulator). The presentation of the logon screen triggers an event in the ESSO software 20 (e.g., line 120). The ESSO software 20 automatically recognizes that the logon screen has been presented, and/or can be notified by the operating system. The event triggered in the ESSO software 20 by the presentation of a logon screen is preferably associated with the type of logon screen and/or with a unique identifier associated with the type of logon screen. The event triggered in the ESSO software 20 is also preferably associated with the resource type (e.g., an account) for the target.

At stage 117, the user enters credentials in response to being prompted to do so by the logon screen. After entering the requested credentials, the application running the logon process validates the credentials supplied by the user. For example, in the event that the user attempts to access an access controlled webpage, the server providing the secure gateway validates the credentials provided by the user. Alternatively, the client application 15 started by the user (e.g., an accounting program) can validate the credentials supplied by the user. The user either fails to logon (e.g., event 125), successfully logs on (e.g., event 130), or successfully logs on but is shown a warning (e.g., a password expiration reminder) (e.g., event 135).

At stages 140 and 145, the ESSO software 20 is configured observe the login events (e.g., events 125, 130, and 135), and to determine whether or not a successful logon event has occurred (which can include when a warning is shown). A successful logon can be detected and one or more ways. For example, a screen indicating successful password change could indicate a successful logon. As a further example, a client application 15 may remember the last window that was open, and restore to that state after a successful logon, which can also be detected as a successful logon by the ESSO software 20. Thus, the ESSO software 20 can be configured to detect one or more different screens as indicating a successful logon.

The ESSO software 20 can also be configured to detect a successful logon after one or more warnings. For example, the ESSO software 20 can recognize and track that a user is prompted to create a new password (e.g., because a prior password has expired), that a user input a password that was too short, that the new corrected password is of the correct length, and/or that the new password was accepted.

At stages 150 and 155, the ESSO software 20 and/or the identity map server 25 process the information received during the logon process to determine whether or not to update the identity map. The ESSO software 20 determines if the unique resource ID, unique target ID, and/or a resource type are already in use in the identity map by querying the identity map server 25. Alternatively, however, the ESSO software 20 can make the logon information available for the identity map server 25 to perform the desired checks at a predetermined time (e.g., using an API and/or web-based interface). The ESSO software 20 causes the identity map server 25 to record the unique resource ID, unique target ID, and/or the resource type if each of the unique resource ID, unique target ID, and/or the resource type are not already in use in the identity map. Alternatively, the identity map server 25 can determine whether or not to update the identity map after performing the desired checks itself.

At stage 160, the ESSO software 20 and/or the identity map server 25 notifies a party of a conflict in the identity map. For example, a notification is sent indicating that there is a conflict with regard to one or more of the unique resource ID, unique target ID, and/or the resource type. Notifications (e.g., an e-mail, a pop-up window, text message) can be provided to the user and/or a third party. Alternatively, an entry in a log may be made rather than sending a notification.

Other embodiments are within the scope and spirit of the invention.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device or in a propagated signal), for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

While the description describes the use of ESSO software, systems that do not use ESSO software can be recorded in the identity map using other techniques. For example, each of the following can be used: i) automated identity mapping via rules that associate accounts with users, ii) manual mapping by a person who directly assigns accounts to users, and/or iii) end user claiming, whereby the user chooses an application and provides credentials (e.g., if the credentials can be validated, and account can be considered to be owned by the user and can be added to the identity map). Other methods can also be used.

While the description describes using enterprise single sign on software, non-enterprise versions of single sign on software can also be used.

Further, while the description above refers to the invention, the description may include more than one invention.

What is claimed is:

1. A computer readable storage device comprising computer readable instructions that, when executed by a computer, cause the computer to:
   determine, using a silent single sign on (SSO) component, if a user is presented with a logon screen related to a resource;
   wherein the silent SSO component operates in silent mode;
   capture logon information received in response to the presented logon screen, using the silent SSO component, wherein at least a portion of the logon information is received from the user;
   determine, using the silent SSO component, if the user successfully accessed the resource using the information received from the user in response to the presented logon screen thereby determining an identity map, wherein the identity map includes information relating to a relationship between the user and the resource, wherein the resource represents the identity of the user;
   store the identity map in an identity map component; and
   determine if the identity map, which is included in the identity map component, includes an entry corresponding to at least one of the user and the resource.

2. The computer readable storage device of claim 1 wherein the instructions are further configured to cause the computer to at least one of create and update an entry in the identity map in response to a determination that the user successfully accessed the resource.

3. The computer readable storage device of claim 1 wherein the instructions are further configured to cause the computer to create an entry in the identity map in response to a determination that the identity map does not include an entry corresponding to either of the user and the resource, the created entry corresponding to at least one of the user and the resource.

4. The computer readable storage device of claim 1 wherein the instructions are further configured to cause the computer to update an entry in the identity map in response to a determination that the identity map includes an entry corresponding to at least one of the user and the resource, the updated entry corresponding to at least one of the user and the resource.

5. The computer readable storage device of claim 1 wherein the instructions are further configured to cause the computer to receive a unique identifier relating to the user from an operating system.

6. The computer readable storage device of claim 1 wherein the logon information includes at least one of a username, a resource name, a resource type, and a password.

7. The computer readable storage device of claim 1 wherein the instructions are further configured to cause the computer to store in the identity map at least a portion of the captured logon information.

8. The computer readable storage device of claim 1 wherein the SSO component is an enterprise single sign on component.

9. The computer readable storage device of claim 1 wherein the instructions are further configured to cause the SSO component to post information, for use by other components, relating to at least a portion of the captured logon information, using at least one of an application programming interface and a web-based interface.

10. A method for creating an identity map, the method comprising:
    determining, using a silent single sign on (SSO) component, if a user is a presented with a logon screen related to a resource;
    wherein the silent SSO component is operating in silent mode;
    capturing logon information received in response to the presented logon screen, using the silent SSO component, wherein at least a portion of the logon information is received from the user;
    determining, using the silent SSO component, if the user successfully accessed the resource using the information received from the user in response to the presented logon screen thereby determining an identity map, wherein the identity map includes information relating to a relationship between the user and the resource, wherein the resource represents the identity of the user;
    determining if an identity map component includes an entry corresponding to at least one of the user and the resource; and
    storing the identity map in the identity map component.

11. The method of claim 10 further comprising at least one of creating and updating an entry in the identity map component in response to a determination that the user successfully accessed the resource.

12. The method of claim 10 further comprising causing the creation of an entry in the identity map component in response to a determination that the identity map component does not include an entry corresponding to either of the user and the resource, the created entry corresponding to at least one of the user and the resource.

13. The method of claim 10 further comprising updating an entry in the identity map component in response to a determination that the identity map includes an entry corresponding to at least one of the user and the resource, the updated entry corresponding to at least one of the user and the resource.

14. The method of claim 10 further comprising receiving a unique identifier relating to the user from an operating system.

15. The method of claim 10 wherein the logon information includes at least one of a username, a resource name, a resource type, and a password.

16. The method of claim 10 further comprising storing in the identity map component at least a portion of the captured logon information.

17. The method of claim 10 wherein the SSO component is an enterprise single sign on component.

18. The method of claim 10 further comprising posting information, for use by other components, relating to at least a portion of the captured logon information, using at least one of an application programming interface and a web-based interface.

19. A computer readable storage device comprising computer readable instructions that, when executed by a computer, cause the computer to:
    receive an indication from a silent single sign on (SSO) component that a user was presented with a logon screen related to a resource, and that the user successfully logged onto the resource;
    wherein the silent SSO component operates in silent mode;

receive logon information from the silent SSO component, wherein at least a portion of the logon information is received from the user in response to the presented logon screen; and use the information received from the silent SSO component to develop an identity map, wherein the identity map includes information relating to a relationship between the user and the resource, wherein the resource represents the identity of the user.

20. The computer readable storage device of claim 19 wherein the computer readable instructions are further configured to cause the computer to create an entry in an identity map in response to at least one of receiving the indication from the SSO component and receiving the logon information from the SSO component.

21. The computer readable storage device of claim 19 wherein the computer readable instructions are further configured to cause the computer to determine, using the logon information received from the SSO component, if the identity map includes an entry corresponding to at least one of the user and the resource.

22. The computer readable storage device of claim 19 wherein the computer readable instructions are further configured to cause the computer to automatically retrieve at least one of the indication from the SSO component and the logon information from the SSO component.

23. The computer readable storage device of claim 22 wherein the computer readable instructions are further configured to cause the computer to automatically retrieve at least one of the indication from the SSO component and the logon information from the SSO component via at least one of an application program interface and a web-based service.

* * * * *